Patented Mar. 10, 1925.

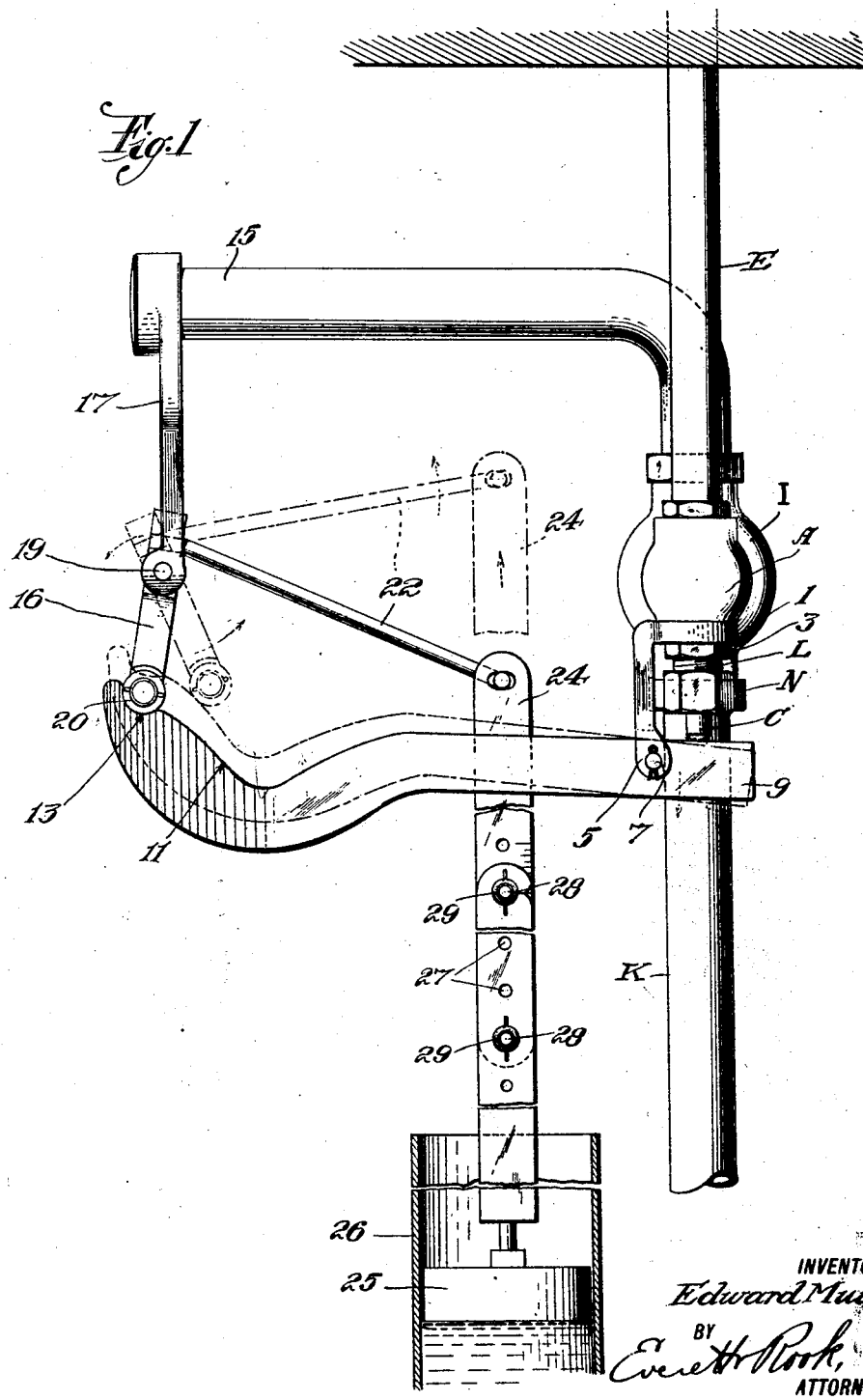

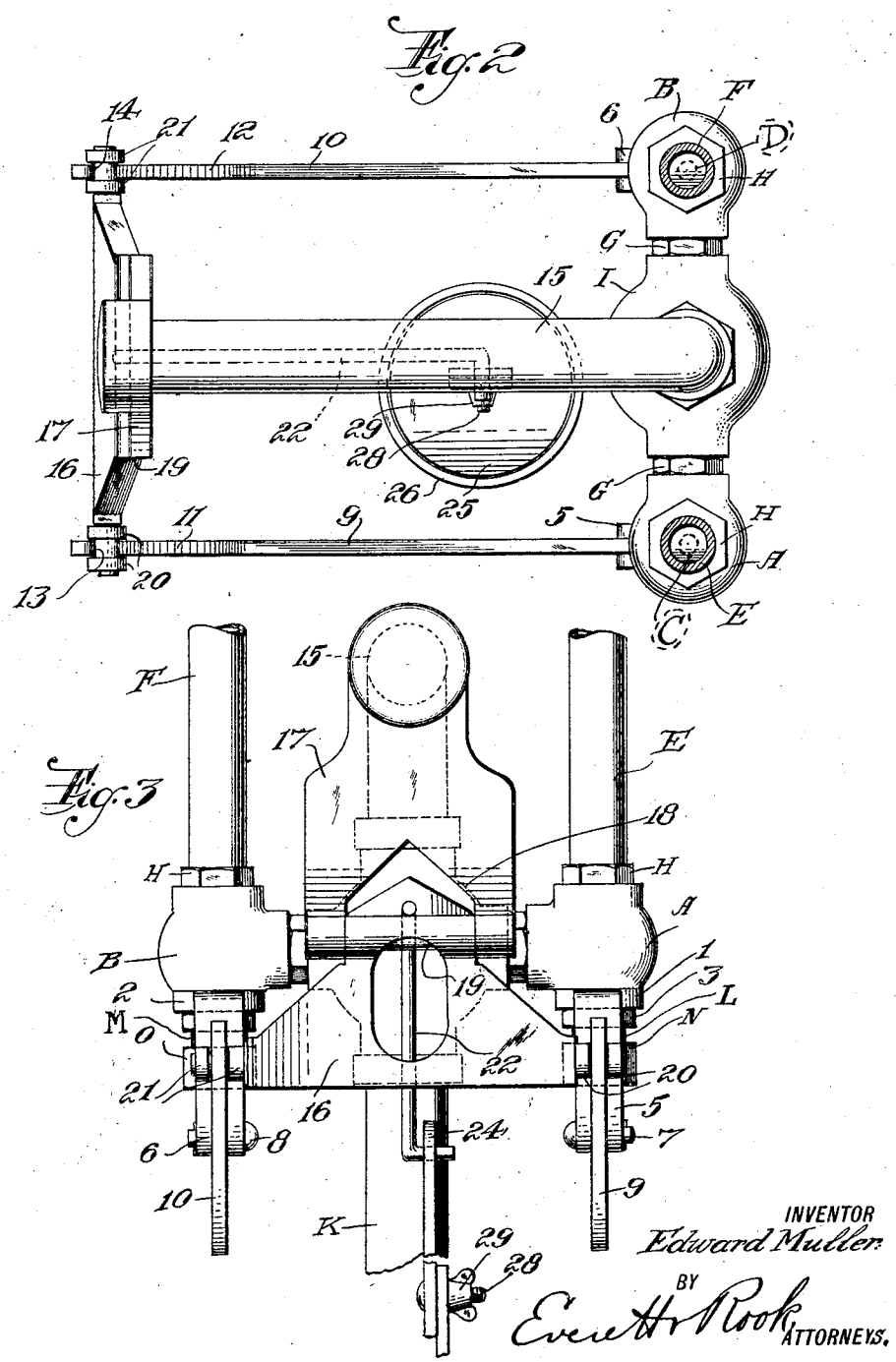

1,529,140

UNITED STATES PATENT OFFICE.

EDWARD MULLER, OF NORTH BERGEN, NEW JERSEY.

AUTOMATIC CONTROL MECHANISM FOR VALVES.

Application filed September 2, 1922. Serial No. 586,035.

*To all whom it may concern:*

Be it known that I, EDWARD MULLER, a citizen of the United States, and a resident of North Bergen, in the county of Hudson and State of New Jersey, have invented new and useful Improvements in Automatic Control Mechanism for Valves, of which the following is a specification.

This invention relates in general to automatic control mechanism and more particularly to a mechanism for maintaining the water or steam valves of washing machines open until the water in said machines reaches a certain or predetermined level and automatically closing or allowing said valves to close when said level is reached.

The primary object of this invention is to provide a control mechanism of the character described embodying novel and improved features of construction whereby the valves are caused to close gradually, thus ensuring a minimum amount of wear thereof and also preventing hammering or noise in the pipes.

Further objects of the invention are to provide such a mechanism adapted for controlling either one or two valves; to provide a control mechanism for washing machine valves including a pair of levers pivotally mounted intermediate their ends with one end of each adapted to engage the stem of a valve, and a device for oscillating said levers controlled by a float actuated by the water in the washing machine whereby both said valves may be operated simultaneously; to utilize in such a device spring or pressure closed valves and mount said levers and actuating mechanism so as to partially counterbalance said springs or pressures and cause said valves to close gradually, to provide a mechanism extremely simple and inexpensive in construction and operation, and to obtain other results and advantages as may be brought out by the following description.

Referring to the accompanying drawings, in which like numerals of reference indicate the same parts throughout the several views, Figure 1 is a side elevation of an automatic valve controlling mechanism embodying my invention;

Figure 2 is a top plan view thereof, and

Figure 3 is a front elevation.

In the embodiment of the invention shown on the drawings, the reference characters A and B indicate spring or pressure closed valves of any suitable or well-known construction which are provided with sliding stems C and D by means of which the valves are opened. The valves are provided with the respective inlet pipes E and F and outlets G and H which are connected by a T-connection I to an inlet pipe K of a reservoir or tank, such as a washing machine. The valve casings are provided with exteriorly threaded necks L and M through which extend the valve stems C and D, the said necks being closed by the bonnets or glands N and O. The construction so far described is old and well-known, and no claim to novelty is made thereon.

In accordance with the invention each of a pair of angle brackets 1 and 2 has one arm thereof secured to one of the valve casings A and B by means of nuts 3 and 4. The other arms of said brackets depend from the valve casings and are provided with bifurcated ends 5 and 6 in which are pivotally mounted intermediate their ends on pivot pins 7 and 8 the respective valve actuating levers 9 and 10. One arm of each of said levers is adapted to engage the corresponding valve stem C or D, and the other ends of the levers are formed with the respective inclined portions 11 and 12 which terminate at their extremities in notches or seats 13 and 14.

A bracket member 15 is rigidly mounted in any suitable manner between the levers 9 and 10 and provides a support for a trip member 16 for actuating the said levers. In the present instance said bracket member is connected to the T-connection I and extends substantially horizontal above the levers 9 and 10, said bracket being provided at its outer end with a depending extension 17 having a bifurcated end 18 between the arms of which is pivotally mounted between its ends on a pivot pin 19 the trip member 16. At the lower side of the pivot pin 19 the trip member 16 is provided with rollers 20 and 21 adapted to engage the respective levers 9 and 10, said rollers cooperating with the inclined surfaces 11 and 12 of said levers to oscillate the same. The trip member 16 is provided at the side of the pivot pin 19 opposite the rollers 20 and 21 with an arm 22 extending inwardly toward the valves A and B, the end of said arm having a pin and slot connection with a link 24 connected to a float 25 mounted in a float chamber 26 connected with the reservoir or tank supplied by the pipe K.

When the controlling mechanism is to be used with a washing machine, one of the valves A or B controls the supply of cold water to the machine and the other valve the supply of steam. If it is desired to simultaneously supply the water and steam, the rollers of the trip member 16 are caused to engage the inclined portions 11 and 12 of the levers 9 and 10, after which the arm 22 is pulled downwardly thereby causing the rollers to ride over said inclined surfaces forcing the corresponding ends of the levers downwardly and the other ends of the levers upwardly to slide the valve stems C and D and open the valves. Movement of the trip member is limited by engagement of the rollers 20 and 21 with the notches or seats 13 and 14, and preferably the position of the rollers in relation to the pivot pins 19, 7 and 8 is such that the trip member holds the levers in this position by the action of a dead center. The float 25 is then adjusted so that the water in the chamber 26, when it reaches a predetermined level, will actuate the float upwardly and oscillate the arm 22 so as to swing the trip member 16 to remove the rollers 20 and 21 from the notches 13 and 14. The springs of the valves A and B or the pressure of the steam or water on said valves then oscillate the levers in the opposite direction into the position indicated by dotted lines in Figure 1 and close the valves. The weight of the levers 9 and 10 and the float 25 and link 24 and the inclination of the inclined portions 11 and 12 of the levers, are such as to partially counterbalance the springs of the valves or the pressures of the water and steam, so that the closing of the valves is slow and gradual. The inclined surfaces 11 and 12 in connection with the movement of the trip member 16 retard the releasing movement of the levers so that the valves are restrained from snapping into closed position. This action minimizes the wear of the valves and valve seats and also prevents sudden throttling of the water and steam which ordinarily causes hammering and noise in the pipes.

The brackets 1 and 2 are preferably rotatable on the necks of the valves A and B so that the levers 9 and 10 may be disengaged from the rollers 20 and 21. This feature of the invention is particularly advantageous where it is desired to control only one of the valves A or B, it being thus possible to actuate either of the levers 9 or 10 independently of the other.

For the purpose of adjusting the float 25 to actuate the valves at various predetermined levels of the water in the washing machine, I may form the link 24 in two sections each provided with a plurality of openings 27 adapted to receive bolts 28 having wing nuts 29 thereon. By placing the bolts 28 in various ones of the openings 27 the sections of the link 24 may be moved longitudinally of each other to vary the length of said link.

While I have shown and described certain details of construction, it will be understood that this is only for the purpose of illustrating the principle of the invention and that many modifications and changes can be made in the details of construction without departing from the spirit or scope of the invention. Therefore, I do not desire to be understood as limiting myself except as required by the following claims when construed in the light of the prior art.

Having thus described the invention, what I claim is:

1. In a device of the character described, the combination with a valve casing having a valve therein, and means for actuating said valve in one direction, of a pair of constantly engaging members movable relatively and together in different directions holding said valve against movement in said direction, one of said members being influenced by said valve and the other serving to oppose such influence, the engaging portions of said members being formed to permit simultaneous movement of said members together and relatively to each other to retard movement of the first-mentioned member, and means actuated by extraneous force for controlling said second-mentioned member to release said first-mentioned member and permit gradual movement of said valve by its actuating means.

2. In a device of the character described, the combination with a valve casing having a valve therein, and means for actuating said valve in one direction, of a lever pivotally mounted intermediate its ends with one end engaging said valve to move the latter into a position against said actuating means upon movement of the lever in one direction, a trip member pivotally mounted on a fixed support to swing longitudinally of and constantly engage the other end of the said lever to hold said valve in said position, and means actuated by extraneous force to swing said trip member and permit movement of said lever for releasing said valve.

3. In a device of the character described, the combination with a valve casing having a valve therein, and means for actuating said valve in one direction, of a lever pivotally mounted intermediate its ends with one end engaging said valve to move the latter into a position against said actuating means upon movement of the lever in one direction, a trip member pivotally mounted on a fixed support to swing longitudinally of and constantly engage the other end of said lever to hold said valve in said position, said lever having a seat to receive said trip member and an inclined surface leading from said seat, and means actuated by extraneous force to swing said trip member from said seat along said inclined surface and permit movement of said lever under the influence of said valve actuating means, cooperation of said inclined surface with said trip member serving to retard movement of said valve.

4. In a device of the character described, the combination with a valve and means for automatically closing the same, of a lever pivotally mounted intermediate its ends with one end adapted to engage said valve, the other end of said lever being formed with an inclined surface, a trip member adapted to engage said surface to hold said valve in open position, and means for actuating said trip member along said inclined surface to release said valve and cause it to gradually close.

5. In a device of the character described, the combination with a valve and means for automatically closing the same, of a lever pivotally mounted intermediate its ends with one end adapted to engage said valve, the other end of said lever being formed with an inclined surface, a pivotally mounted trip member adapted to engage said surface to hold said valve in open position, and means for swinging said trip member to release said valve, cooperation of said trip member and said inclined surface of said lever retarding the closing of said valve by said actuating means.

6. In a device of the character described, the combination with a support having a movable member therein and means for actuating said member in one direction, of two cooperating members for temporarily holding said movable member against movement, one of said members having an inclined surface engaged by the other to retard movement of said movable member when the same is released.

7. In a device of the character described, the combination with a valve for controlling the flow of a liquid to a receptacle and means for closing said valve, of means including a pair of cooperating members for holding said valve in open position, one of said members having an inclined surface engaged by the other, and a float arranged on the surface of the liquid in said receptacle and connected to one of said members, said float causing relative movement of said last-mentioned member and said inclined surface as the level of said liquid rises to permit gradual closing of said valve by said closing means.

EDWARD MULLER.